US012774403B2

(12) United States Patent
Balbo-Block et al.

(10) Patent No.: US 12,774,403 B2
(45) Date of Patent: Oct. 27, 2026

(54) LAYERED CONSTRUCTION HAVING AN ADHESIVE STRIP AND TWO LINERS

(71) Applicant: TESA SE, Norderstedt (DE)

(72) Inventors: Marco Balbo-Block, Hamburg (DE); Jochen Fiencke, Hamburg (DE); Martin Geelink, Hamburg (DE); Marcus Müller, Grand Rapids, MI (US)

(73) Assignee: tesa, Norderstedt (DE)

( * ) Notice: Subject to any disclaimer, the term of this patent is extended or adjusted under 35 U.S.C. 154(b) by 480 days.

(21) Appl. No.: 18/030,117

(22) PCT Filed: Oct. 1, 2021

(86) PCT No.: PCT/EP2021/077102
§ 371 (c)(1),
(2) Date: Apr. 4, 2023

(87) PCT Pub. No.: WO2022/073870
PCT Pub. Date: Apr. 14, 2022

(65) Prior Publication Data

US 2024/0018395 A1 Jan. 18, 2024

Related U.S. Application Data

(60) Provisional application No. 63/089,614, filed on Oct. 9, 2020.

(51) Int. Cl.
*C09J 7/40* (2018.01)
*B32B 3/02* (2006.01)
(Continued)

(52) U.S. Cl.
CPC .................. *C09J 7/40* (2018.01); *B32B 3/02* (2013.01); *B65H 18/085* (2013.01); *B65H 75/02* (2013.01);
(Continued)

(58) Field of Classification Search
None
See application file for complete search history.

(56) References Cited

U.S. PATENT DOCUMENTS

2010/0119803 A1* 5/2010 Kosaka ...................... C09J 7/38
428/222
2017/0260424 A1 9/2017 Ellringmann et al.
2019/0126584 A1 5/2019 Fleischhacker

FOREIGN PATENT DOCUMENTS

CN 108778712 A 11/2018
DE 102008031356 A1 1/2010
(Continued)

OTHER PUBLICATIONS

Machine translation of KR-20130092112-A (Year: 2013).*
(Continued)

*Primary Examiner* — Frank D Ducheneaux
(74) *Attorney, Agent, or Firm* — Norris McLaughlin, P.A.

(57) ABSTRACT

Layer constructions allow an adhesive tape to be wound to form a spool simply and with relatively uncomplicated apparatus. At least one layered construction comprises: an adhesive tape comprising at least one outer layer of pressure-sensitive adhesive; a release liner lying on the outer layer of pressure-sensitive adhesive; and an interliner lying on the side of the adhesive tape opposite the outer layer of pressure-sensitive adhesive, at least the side of the interliner facing away from the adhesive tape being adhesively furnished, wherein all layers of the layered construction finish substantially flush with respect to each other. At least one spool comprising a spool core and the at least one layered construction wound crosswise in a plurality of plies on said core, and a method for producing the at least one spool are also disclosed.

5 Claims, 1 Drawing Sheet

(51) Int. Cl.

| | |
|---|---|
| ***B65H 18/08*** | (2006.01) |
| ***B65H 75/02*** | (2006.01) |
| ***C09J 7/20*** | (2018.01) |
| ***C09J 7/24*** | (2018.01) |
| ***C09J 7/25*** | (2018.01) |
| ***C09J 7/26*** | (2018.01) |
| ***C09J 7/29*** | (2018.01) |
| ***C09J 7/38*** | (2018.01) |

(52) U.S. Cl.

CPC .............. *C09J 7/201* (2018.01); *C09J 7/241* (2018.01); *C09J 7/255* (2018.01); *C09J 7/26* (2018.01); *C09J 7/29* (2018.01); *C09J 7/383* (2018.01); *C09J 7/385* (2018.01); *B65H 2301/4191* (2013.01); *B65H 2701/377* (2013.01); *C09J 2301/124* (2020.08); *C09J 2400/24* (2013.01)

(56) References Cited

FOREIGN PATENT DOCUMENTS

| | | | | | |
|---|---|---|---|---|---|
| DE | 102015112206 | A1 | | 2/2017 | |
| DE | 102017223768 | A1 | | 6/2019 | |
| EP | 1035185 | A2 | | 9/2000 | |
| EP | 2039506 | A1 | | 3/2009 | |
| EP | 2746356 | A1 | | 6/2014 | |
| EP | 3216838 | A | | 9/2017 | |
| KR | 20130092112 | A | * | 8/2013 | ................ C09J 7/26 |
| WO | 2012118933 | A | | 8/2013 | |
| WO | 2017205444 | A1 | | 11/2017 | |
| WO | 2019122040 | A2 | | 6/2019 | |

OTHER PUBLICATIONS

English translation of International Search Report dated Dec. 17, 2021, in connection with PCT International Application No. PCT/EP2021/077102.

International Search Report dated Dec. 17, 2021, in connection with PCT International Application No. PCT/EP2021/077102.

Written Opinion in connection with PCT International Application No. PCT/EP2021/077102.

* cited by examiner

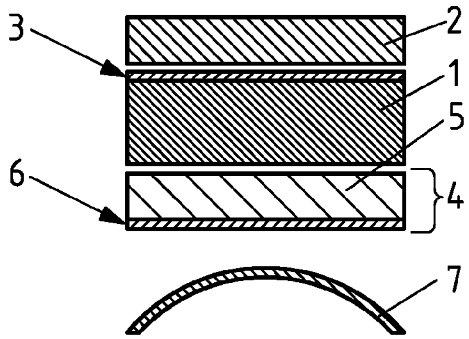
3
2
1
5
6
4
7

LAYERED CONSTRUCTION HAVING AN ADHESIVE STRIP AND TWO LINERS

This application is a 371 of PCT/EP2021/077102, filed Oct. 1, 2021, which claims priority benefit under 35 U.S.C. § 119 of the U.S. Provisional Patent Application No. 63/089,614, filed Oct. 9, 2020, the disclosures of which are incorporated herein by reference.

The invention is situated within the technical field of adhesive tapes, of the kind multivariously used for the temporary or permanent joining of a wide variety of different substrates. The invention, more specifically, relates to a layered construction which comprises an adhesive tape and two liners and which permits uncomplicated winding of the adhesive tape to form a spool.

In the context of the industrial and/or else automated use and processing of adhesive tapes, in the automobile industry, for example, there is frequently a preference for an adhesive tape which is available in a quasi-continuous running length. Accordingly, the adhesive tape is dispatched from the adhesive tape manufacturer to the user conveniently in a form of package which is able to accommodate an extremely high length of adhesive tape. With the most commonplace type of package, known as a pan-cake, which is produced by winding the adhesive tape onto a core without axial advancement, meaning that the resulting roll has the same width as the adhesive tape, it is not generally possible to realize substantial running lengths and narrow tape widths. An alternative type of package, that has been available for some decades, is that of the "spool", occasionally also called "level wound spool". With spooling, winding takes place with an axial advancement which is usually uniform over the spool width and whose orientation is reversed in each case at the intended spool edges, and hence on transition into the next ply of windings. Regarding the terms of spooling technology, incidentally, reference is made to the electronic textbook, posted on the internet as of Jul. 1, 2001, from the company "Double R Controls Ltd., England", authored by Neal Rothwell and titled "Technical Information on the Principles of Spooling".

Typically available as starting material for the production of adhesive tapes is a roll having a very high width of, for example, 200 to 600 mm (master roll), from which a slitting mechanism generates a plurality of individual strips in the width required for the intended use of the adhesive tape. The spooling operation, thus, generally consists of the following steps:

a) unwinding of the master roll;
b) generation of a multiplicity of substantially parallel individual strips ("mults") in the required width;
c) winding of the individual mults onto a corresponding number of winding stands, to form level wound spools.

The adhesive tapes for winding are usually lined on one side with a release liner, and equipped on the remaining side, where appropriate additionally, with what is called an interliner, which provides additional protection during winding and during subsequent storage as a spool. In the case of single-sidedly lined adhesive tapes with little or no side edge stickiness, the interliner, if required, is laminated onto the unwound adhesive tape, in the same width, in practice ahead of the slitting unit. Slitting is therefore carried out on the double-sidedly lined adhesive tape, which is subsequently present in the form of a layered construction with flush-finishing layers and can be wound up in this form to give the spool. Examples of typical adhesive tapes with little or no side edge stickiness are those consisting of a PE foam core with a respective pressure-sensitive adhesive layer on the two primary sides of the cross section of the PE foam. The two secondary sides of the adhesive tape cross section are the side edges. The foamed PE possesses no pressure-sensitive adhesiveness or tack, and so it is impossible, or barely possible, for the side edges of the adhesive tape to become stuck to one another.

Typical adhesive tapes with greater side edge stickiness are, for example, foamed pressure-sensitive adhesives (single-layer foam adhesive tapes), or multilayer foam adhesive tapes having a foamed, acrylate-based core and additional pressure-sensitive adhesive layers.

For adhesive tapes with a pronounced side edge stickiness, the interliner must typically be wider than the adhesive tape and accordingly it protrudes at least on one side, usually on both sides. This protrusion prevents the side edges of the adhesive tape wound to form the spool from sticking to one another, a phenomenon also referred to as "blocking". Because of the protrusion, however, the interliner cannot be laminated on ahead of slitting, but must instead, only thereafter, be trimmed to the target width and placed separately onto all the tapes individually. This is a significant extra logistical and technical effort, requiring additional stations on the spooler and reducing the spooling speed. As a result of the slower operation involving greater effort, the spooling of adhesive tapes with side edge stickiness is substantially more expensive than the tapes without side edge stickiness.

There has been no lack of attempts in the prior art to find optimized solutions specifically for adhesive tapes featuring pronounced side edge stickiness.

EP 3 216 838 A1 describes a composite system comprising

- an adhesive tape (A), comprising a layer of pressure-sensitive adhesive and a heat-activatable layer of adhesive;
- a release liner lying on the pressure-sensitive adhesive layer of the adhesive tape (A); and
- an adhesive tape (B), comprising a carrier layer, a release layer on one side of the carrier layer, and a pressure-sensitive adhesive layer on the side of the carrier layer opposite to the release layer;

wherein the pressure-sensitive adhesive layer of the adhesive tape (B) is in direct contact with the heat-activatable adhesive layer of the adhesive tape (A), and the adhesive tape (B) has a peel adhesion of not more than 5 N/cm, determined according to EN 1939:2003, to the heat-activatable adhesive layer of the adhesive tape (A). The tacky side of the interliner (adhesive tape (B)) is oriented toward the heat-sealing layer of the adhesive tape (A), in order to generate an adhesion between interliner and adhesive tape. The interliner is described as being wider than the adhesive tape.

EP 2 746 356 A1 discloses a roll of an acrylic foam tape, said roll comprising an acrylic foam tape which in turn comprises an acrylic foam having opposing first and second primary faces. The first primary face comprises a pressure-sensitive adhesive, protected by a first liner; the second primary face comprises a heat-activatable adhesive. The acrylic foam tape is wound in helical winds around a core, to form a level wound spool; a second liner is disposed on the heat-activatable adhesive and extends over at least one edge of the second primary face. The acrylic foam is thermally crosslinked.

DE 10 2017 223 768 A1 describes a splittable liner which is suitable for lining an adhesive tape; a double-sided adhesive tape lined with this liner; and a spool with an adhesive tape of this kind wound thereon. The liner is said to project at least over one of the two edges of the adhesive tape itself. This construction is said to reduce the propensity for forming folds during the spooling and despooling of a thick, preferably foamed adhesive tape, and to stabilize the spool.

EP 1 035 185 A2 has as its subject matter a multi-ply, level wound spool of carrier-free, double-sidedly pressure-sensitively adhesive transfer tape, the spool consisting of a pressure-sensitive layer of a film of adhesive whose plies are wound, with a detachable covering and additionally with an intermediate ply, to form a spool, on a spool body. The intermediate covering has weak pressure-sensitive adhesion at least on the reverse, and is wider than the adhesive tape.

EP 2 039 506 A1 describes a release liner which is composed of a single-ply or laminated film and which comprises a release layer having a peel adhesion (23° C.) on an acrylate substrate of 0.02 to 0.5 N/20 mm. Also described is an adhesive tape wherein a release liner of this kind adheres on one of its pressure-sensitively adhesive surfaces, with the width of the release liner being greater than that of the pressure-sensitive adhesive surface.

It was an object of the invention to provide a construction with which an adhesive tape can be wound into a spool simply and with little apparatus involved. A first and general subject of the invention, with which this object is achieved, is a layered construction which comprises

- an adhesive tape comprising at least one outer layer of pressure-sensitive adhesive (PSA-A);
- a release liner (RL) lying on the outer layer of pressure-sensitive adhesive (PSA-A); and
- an interliner (IL) lying on the side of the adhesive tape opposite the outer layer of pressure-sensitive adhesive (PSA-A), at least the side of the interliner facing away from the adhesive tape being adhesively furnished;

and wherein all of the layers of the layered construction finish substantially flush. A construction of this kind on the one hand enables a stable position of the individual sections or plies of the adhesive tape provided with the liners on the spool, even under external or internal loads, and on the other hand can be produced in such a way that the interliner (IL) can be laminated onto the adhesive tape, unwound from the master roll, during the actual production of the master roll or in the spooler, and hence ahead of the slitting. There is consequently no need for the separate lamination of the interliner, trimmed to the target width, onto each individual adhesive tape trimmed into target width; instead, the layered construction can be made available with the master roll itself, trimmed to the target width, and then immediately wound to form the spool. Additionally, as a result of the pressure-sensitively adhesive fastening of the sections or plies, even in the case of low winding tensions, it is possible to produce a dimensionally stable spool, allowing the adhesive tape to be wound very gently and without squeezing, and avoiding instances of sticking between sections in spite of a lack of interliner width.

An adhesive tape is understood, in line with the usual understanding, to be a pressure-sensitively adhesively furnished, strip-form construct, which may or else may not have a carrier material. The adhesive tape of the layered construction of the invention comprises at least one outer layer of pressure-sensitive adhesive. Beyond this, the structure of the adhesive tape is fundamentally arbitrary. The adhesive tape may comprise one or else two or more carrier materials or carrier layers, which may consist of all common materials, and more particularly, then, of films or else of foams. The adhesive tape may also comprise any desired functional layers, barrier layers for example.

The expression "comprises at least one outer layer of pressure-sensitive adhesive" also embraces an adhesive tape which consists only of a single layer of pressure-sensitive adhesive (adhesive transfer tape).

In line with the object of the invention, the layered construction of the invention and hence also the adhesive tape can preferably be wound up into a spool—that is, the adhesive tape, preferably, has corresponding deformability and sufficient dimensional stability so that when the individual plies are wound one over another, there is no squeezing-out and no slippage of the layers in such a way that the adhesive tape character is lost.

A pressure-sensitive adhesive or PSA refers in accordance with the invention, as usual in the common usage, to a substance which at least at room temperature is durably tacky and also adhesive. A characteristic of a PSA is that it can be applied by pressure to a substrate and remains adhering there, with no closer definition of the pressure to be applied or of the period of exposure to this pressure. In general, though dependent in principle on the precise nature of the PSA and also of the substrate, the temperature, and the atmospheric humidity, exposure to a brief, minimal pressure, which does not go beyond gentle contact for a short moment, is enough to achieve the adhesion effect; in other cases, a longer period of exposure to a higher pressure may also be necessary.

PSAs have particular, characteristic viscoelastic properties which result in the durable tack and adhesiveness. A feature of these adhesives is that when they are mechanically deformed, there are processes of viscous flow and there is also development of elastic forces of recovery. The two processes have a certain relationship to one another in terms of their respective proportion, in dependence not only on the precise composition, the structure, and the degree of crosslinking of the PSA, but also on the rate and duration of the deformation, and on the temperature.

The proportional viscous flow is necessary for the achievement of adhesion. Only the viscous components, frequently brought about by macromolecules with relatively high mobility, permit effective wetting and effective flow onto the substrate that is to be bonded. A high viscous flow component results in high pressure-sensitive adhesiveness (also referred to as tack or surface stickiness) and hence often also in a high adhesion. Highly crosslinked systems, crystalline polymers or polymers with glasslike solidification lack flowable components and in general are therefore devoid of tack or at least possess only little tack.

The proportional elastic forces of recovery are necessary for the achievement of cohesion. They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For more precise description and quantification of the extent of elastic and viscous components, and also of the relationship between the components, the variables of storage modulus (G') and loss modulus (G") are employed, and can be determined by means of dynamic mechanical analysis (DMA). G' is a measure of the elastic component, G" a measure of the viscous component, of a substance. Both variables are dependent on the deformation frequency and the temperature.

The variables can be determined using a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle δ.

The storage modulus G' is defined as follows: $G'=(\tau/\gamma)\cdot\cos(\delta)$ (τ=shear stress, γ=deformation, δ=phase angle=phase shift between shear stress vector and deformation vector). The definition of the loss modulus G" is as follows: $G''=(\tau/\gamma)\cdot\sin(\delta)$ (τ=shear stress, γ=deformation, δ=phase angle=phase shift between shear stress vector and deformation vector).

A composition is considered in particular to be a pressure-sensitive adhesive, and is defined in particular as such for the purposes of the invention, when at 23° C., in the deformation frequency range from $10^0$ to $10^1$ rad/sec, both G' and G" are situated at least partly in the range from $10^3$ to $10^7$ Pa. "Partly" means that at least a section of the G' or G" curve, respectively, lies within the window subtended by the deformation frequency range from $10^0$ inclusive up to $10^1$ inclusive rad/sec (abscissa) and by the G' or G" value range from $10^3$ inclusive to $10^7$ inclusive Pa (ordinate).

The adhesive tape of the layered construction of the invention may comprise one or two outer layers of pressure-sensitive adhesive—that is, it may consist only of a single PSA layer, and hence be present in the form of what is called an adhesive transfer tape, or may have a PSA layer only on one side or on both sides of a carrier material, and hence may take the form of a single-sided or double-sided adhesive tape. It is also possible for the carrier material itself to be pressure-sensitively adhesive, meaning that even an adhesive tape provided with an additional PSA layer only on one side can be given a double-sidedly adhering form. Moreover, the adhesive tape may also have one or more internal layers of pressure-sensitive adhesive, serving to join to one another other layers present within the construction of the adhesive tape.

The design of the outer PSA layer (PSA-A) and of any further outer PSA layer that may be present is also fundamentally arbitrary, provided it does not run counter to the aim of the invention.

The adhesive tape in one embodiment comprises a foam layer. A "foam layer" or a "foamed layer" refers to a layer which comprises a matrix material and a plurality of cavities, so that the density of the foam is reduced to a technically utilizable extent by comparison with the density of the pure matrix material. In the case of adhesive tapes, a foam more particularly is a continuous polymer matrix filled with air/gas bubbles without their own shell or with their own shell—e.g., with expanded polymeric microballoons and/or hollow glass spheres—such that the resultant foam has a density of, for example, 100 to 900 g/L. Foamed layers frequently endow adhesive tapes with particularly advantageous properties, examples being higher peel adhesion on uneven substrates, and the capacity to dampen impacts, and also to compensate different thermally induced expansions and gap tolerances. However, adhesive tapes having foam layers, specifically, are particularly susceptible to the phenomenon of side edge stickiness, and so the advantages of the layered construction of the invention in relation to producing spooled adhesive tape come particularly greatly to the fore here.

The matrix material of the foam layer preferably comprises at least one poly(meth)acrylate, at least one synthetic rubber, natural rubber, and/or a mixture of two or more of these polymers; more preferably the matrix material comprises at least one poly(meth)acrylate and/or at least one synthetic rubber.

A "poly(meth)acrylate" is understood to be a polymer which is obtainable by radical polymerization of acrylic and/or methacrylic monomers and also, optionally, further, copolymerizable monomers. A "poly(meth)acrylate" more particularly is a polymer whose monomer basis consists to an extent of at least 50 wt % of acrylic acid, methacrylic acid, acrylic esters and/or methacrylic esters, with acrylic esters and/or methacrylic esters being included at least fractionally, preferably to an extent of at least 30 wt %, based on the overall monomer basis of the polymer in question.

In one embodiment the foam layer comprises poly(meth)acrylate at a total of 40 to 70 wt %, preferably at a total of 45 to 60 wt %, based in each case on the total weight of the foam layer. In another embodiment the foam layer comprises poly(meth)acrylate at a total of at least 90 wt %, preferably at least 95 wt %, based in each case on the total weight of the foam layer. One (single) poly(meth)acrylate, or two or more poly(meth)acrylates, may be present. The foam layer in particular is based on poly(meth)acrylate.

The glass transition temperature of the poly(meth)acrylate of the foam layer is preferably <0° C., more preferably between −20 and −50° C. The glass transition temperature of polymers or of polymer blocks in block copolymers is determined in the invention by means of dynamic scanning calorimetry (DSC), with glass transitions being recognized as steps in the thermogram.

In one embodiment the poly(meth)acrylate of the foam layer comprises at least one fractionally copolymerized, functional monomer which is reactive preferably with epoxide groups to form a covalent bond. More preferably the fractionally copolymerized, functional monomer which is reactive more preferably with epoxide groups to form a covalent bond comprises at least one functional group selected from the group consisting of carboxylic acid groups, sulfonic acid groups, phosphonic acid groups, hydroxyl groups, acid anhydride groups, epoxide groups, and amino groups; more particularly it comprises at least one carboxylic acid group. Very preferably the poly(meth)acrylate comprises fractionally copolymerized acrylic acid and/or methacrylic acid. All of the stated groups have reactivity with epoxide groups, so making the poly(meth)acrylate amenable advantageously to thermal crosslinking with introduced epoxides.

In another embodiment the poly(meth)acrylate of the foam layer comprises at least one fractionally copolymerized monomer having at least one functional group which is able to support or initiate a subsequent radiation crosslinking, in particular through UV radiation. The poly(meth)acrylate of the foam layer preferably comprises fractionally copolymerized benzoin acrylate or at least one fractionally copolymerized, acrylate-functionalized benzophenone derivative.

Crosslinking of the poly(meth)acrylate with electron beams is also possible in principle.

The poly(meth)acrylate of the foam layer may preferably be derived from the following monomer composition:

a) at least one acrylic ester and/or methacrylic ester of the following formula (1)

$$CH_2{=}C(R^I)(COOR^{II}) \qquad (1),$$

in which $R^I$=H or $CH_3$ and $R^{II}$ is an alkyl radical having 4 to 18 carbons;

b) at least one olefinically unsaturated monomer having at least one functional group selected from the group consisting of carboxylic acid groups, sulfonic acid groups, phosphonic acid groups, hydroxyl groups, acid anhydride groups, epoxide groups, and amino groups;

c) optionally further acrylic esters and/or methacrylic esters and/or olefinically unsaturated monomers which are copolymerizable with component (a).

It is particularly advantageous to select the monomers of component a) with a fraction of 45 to 99 wt %, the monomers of component b) with a fraction of 1 to 15 wt %, and the monomers of component c) with a fraction of 0 to 40 wt %, the FIGURES being based on the monomer mixture for the base polymer without additions of possible additives such as resins, etc.

The monomers of component a) are generally plasticizing, more apolar monomers. With particular preference $R^{II}$ in the monomers a) is an alkyl radical having 4 to 10 carbons or 2-propylheptyl acrylate or 2-propylheptyl methacrylate. The monomers of the formula (1) are more particularly selected from the group consisting of n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate, isobutyl acrylate, isooctyl acrylate, isooctyl methacrylate, 2-ethylhexyl acrylate, 2-ethylhexyl methacrylate, 2-propylheptyl acrylate, and 2-propylheptyl methacrylate.

The monomers of component b) are with particular preference selected from the group consisting of acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, especially 2-hydroxyethyl acrylate, hydroxypropyl acrylate, especially 3-hydroxypropyl acrylate, hydroxybutyl acrylate, especially 4-hydroxybutyl acrylate, hydroxyhexyl acrylate, especially 6-hydroxyhexyl acrylate, hydroxyethyl methacrylate, especially 2-hydroxyethyl methacrylate, hydroxypropyl methacrylate, especially 3-hydroxypropyl methacrylate, hydroxybutyl methacrylate, especially 4-hydroxybutyl methacrylate, hydroxyhexyl methacrylate, especially 6-hydroxyhexyl methacrylate, allyl alcohol, glycidyl acrylate, glycidyl methacrylate.

Illustrative monomers of component c) are as follows:

Methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, methyl 3-methoxyacrylate, 3-methoxybutyl acrylate, 2-phenoxyethyl methacrylate, butyl diglycol methacrylate, ethylene glycol acrylate, ethylene glycol monomethyl acrylate, methoxypolyethylene glycol methacrylate 350, methoxypolyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide; N,N-dialkyl-substituted amides such as, for example, N,N-dimethylacrylamide and N,N-dimethylmethacrylamide; N-benzylacrylamide, N-isopropylacrylamide, N-tert-butylacrylamide, N-tert-octylacrylamide, N-methylolacrylamide, N-methylolmethacrylamide, acrylonitrile, methacrylonitrile; vinyl ethers such as vinyl methyl ether, ethyl vinyl ether, vinyl isobutyl ether; vinyl esters such as vinyl acetate; vinyl halides, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene; macromonomers such as 2-polystyrene-ethyl methacrylate (weight-average molecular weight Mw, determined by GPC, of 4000 to 13 000 g/mol), poly(methyl methacrylate)-ethyl methacrylate (Mw of 2000 to 8000 g/mol).

Monomers of component c) may advantageously also be selected such that they contain functional groups which support subsequent radiation crosslinking (for example, by electron beams, UV). Suitable copolymerizable photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide, and allyl acrylate.

The poly(meth)acrylates are prepared preferably by conventional radical polymerizations or controlled radical polymerizations. The poly(meth)acrylates may be prepared by copolymerization of the monomers using customary polymerization initiators and also, optionally, chain transfer agents, with polymerization taking place at the customary temperatures in bulk, in emulsion, in water or liquid hydrocarbons, for example, or in solution.

The poly(meth)acrylates are preferably prepared by copolymerization of the monomers in solvents, more preferably in solvents having a boiling range of 50 to 150° C., more particularly of 60 to 120° C., using 0.01 to 5 wt %, more particularly 0.1 to 2 wt %, of polymerization initiators, based in each case on the total weight of the monomers.

All customary initiators are suitable in principle. Examples of radical sources are peroxides, hydroperoxides, and azo compounds, examples being dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate, and benzopinacol. Preferred radical initiators are 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Preferred solvents for the preparation of the poly(meth) acrylates are alcohols such as methanol, ethanol, n- and isopropanol, n- and isobutanol, especially isopropanol and/or isobutanol; hydrocarbons such as toluene and, in particular, petroleum spirits with a boiling range of 60 to 120° C.; ketones, especially acetone, methyl ethyl ketone, methyl isobutyl ketone; esters such as ethyl acetate; and also mixtures of the aforementioned solvents. Particularly preferred solvents are mixtures which comprise isopropanol in amounts of 2 to 15 wt %, more particularly of 3 to 10 wt %, based in each case on the solvent mixture employed.

The poly(meth)acrylates may also be prepared solventlessly. For example, the monomers can be prepolymerized under the influence of heat or UV radiation until they have a syrupy consistency; the resultant syrup, which contains not only monomers but also polymer already, may then be mixed with further components and subsequently shaped into a web. The final polymerization and, where appropriate, crosslinking take place shortly after shaping, by further heat treatment or UV irradiation of the resultant web. The other components with which the syrup is mixed may comprise foaming agents, examples being hollow polymeric microspheres or hollow glass spheres; in that case the foam is obtained directly with the final polymerization.

In another variant of the process regime for producing the foam layer, the preparation (polymerization) of the poly (meth)acrylates is followed by concentration, and the further processing of the poly(meth)acrylates is substantially solventless. The polymer may be concentrated in the absence of crosslinker and accelerator substances. An alternative possibility is to add one of these classes of compound to the polymer ahead of the concentration, so that the concentration then takes place in the presence of this or these substance(s).

After the concentration step, the polymers can be transferred to a compounder, where they are blended with further components, including in particular the foaming agents. Concentration and compounding may also take place in the same reactor, optionally.

The weight-average molecular weights $M_w$ of the polyacrylates are preferably in a range from 20 000 to 2 000 000 g/mol; very preferably they are in a range from 100 000 to 1 500 000 g/mol, and most preferably in a range from 150 000 to 1 000 000 g/mol. For this purpose it may be advantageous to conduct the polymerization in the presence of suitable chain transfer agents such as thiols, halogen compounds and/or alcohols, in order to bring about the desired average molecular weight. The FIGURES for the number-average molar mass $M_n$ and the weight-average molar mass $M_w$ in this specification are based on the conventional determination by gel permeation chromatography (GPC).

The poly(meth)acrylate of the foam layer preferably has a polydispersity PD<4 and hence a relatively narrow molecular weight distribution. Foams based thereon, in spite of a relatively low molecular weight, have particularly good shear strength after crosslinking. Moreover, the lower polydispersity makes processing from the melt easier, since the flow viscosity is lower than that of a more broadly distributed poly(meth)acrylate, for largely the same application properties. Narrowly distributed poly(meth)acrylates may be prepared advantageously by anionic polymerization or by controlled radical polymerization methods, the latter being especially suitable. Such poly(meth)acrylates may also be prepared via N-oxyls. Furthermore, atom transfer radical polymerization (ATRP) may be employed advantageously for the synthesis of narrowly distributed poly(meth) acrylates, with the initiator used preferably comprising monofunctional or difunctional, secondary or tertiary halides, and the halides abstracted using Cu, Ni, Fe, Pd, Pt, Ru, Os, Rh, Co, Ir, Ag or Au complexes. RAFT polymerization is suitable as well.

In one embodiment the poly(meth)acrylates are crosslinked by linking reactions—especially in the sense of addition reactions or substitution reactions—of functional groups contained therein with thermal crosslinkers. It is possible to use all thermal crosslinkers which

- not only ensure a sufficiently long working time, so that there is no gelling during the processing operation, especially the extrusion process,
- but also lead to rapid postcrosslinking of the polymer to the desired degree of crosslinking at temperatures lower than the processing temperature, more particularly at room temperature.

Thermal crosslinkers are used preferably at 0.1 to 5 wt %, more particularly at 0.2 to 1 wt %, based on the total amount of polymer to be crosslinked.

Crosslinking via complexing agents, also referred to as chelates, is also possible. An example of one preferred complexing agent is aluminum acetyl acetonate.

The poly(meth)acrylate of the foam layer is preferably crosslinked by means of an epoxide and/or by means of one or more substances containing epoxide groups. The substances containing epoxide groups are more particularly polyfunctional epoxides, namely those having at least two epoxide groups; correspondingly, the overall result is an indirect linking of the poly(meth)acrylate building blocks that carry the functional groups. The substances containing epoxide groups may be aromatic compounds and also aliphatic compounds.

With particular preference the poly(meth)acrylates are crosslinked by means of a crosslinker-accelerator system ("crosslinking system") in order to obtain more effective control over the working time, the crosslinking kinetics, and the degree of crosslinking. The crosslinker-accelerator system preferably comprises as crosslinker at least one substance containing epoxide groups, and as accelerator at least one substance which has an accelerating effect on the crosslinking reaction at a temperature below the melting temperature of the polymer to be crosslinked.

In one embodiment the foam layer or the matrix material of the foam layer comprises at least one synthetic rubber.

The foam layer may comprise synthetic rubber at a total of 15 to 50 wt %, more preferably at a total of 20 to 40 wt %, based in each case on the total weight of the foam layer, and in particular the foam layer then also comprises at least one poly(meth)acrylate. In this case, preferably, the synthetic rubber is present in dispersion in the poly(meth) acrylate in the foam layer. Poly(meth)acrylate and synthetic rubber, accordingly, are preferably each homogenous phases. In this embodiment, preferably, the foam layer comprises 40-70 wt % of at least one poly(meth)acrylate and 15-50 wt % of at least one synthetic rubber, based in each case on the total weight of the foam layer.

The foam layer may alternatively be based on synthetic rubber, and in that case comprises synthetic rubber at a total of at least 90 wt %, preferably at a total of at least 95 wt %, based in each case on the total weight of the foam layer. There may be one synthetic rubber or two or more synthetic rubbers present in the foam layer.

The synthetic rubber of the foam layer is preferably a block copolymer having an A-B, A-B-A, $(A\text{-}B)_n$, $(A\text{-}B)_nX$ or $(A\text{-}B\text{-}A)_nX$ structure, in which

- the blocks A independently of one another are a polymer formed by polymerization of at least one vinylaromatic;

the blocks B independently of one another are a polymer formed by polymerization of conjugated dienes having 4 to 18 carbons and/or isobutylene, or are a partly or fully hydrogenated derivative of such a polymer;

X is the radical of a coupling reagent or initiator; and n is an integer ≥2.

In particular, where there are multiple synthetic rubbers present, all of these rubbers in the foam layer are block copolymers having a structure as set out above. The foam layer may therefore also comprise mixtures of different block copolymers having the above structure.

The preferred synthetic rubbers, which are also referred to as vinylaromatic block copolymers, thus comprise one or more rubbery blocks B (soft blocks) and one or more glassy blocks A (hard blocks). More preferably the synthetic rubber is a block copolymer having an A-B, A-B-A, $(A\text{-}B)_3$ X or $(A\text{-}B)_4$ X structure, where A, B, and X are subject to the definitions above. With very particular preference, all of the synthetic rubbers in the foam layer are block copolymers having an A-B, A-B-A, $(A\text{-}B)_3X$ or $(A\text{-}B)_4X$ structure, where A, B, and X are subject to the definitions above. More particularly the synthetic rubber of the foam layer is a mixture of block copolymers having an A-B, A-B-A, $(A\text{-}B)_3$ X or $(A\text{-}B)_4$ X structure, the mixture preferably comprising at least diblock copolymers A-B and/or triblock copolymers A-B-A.

The block A is, in particular, a glassy block having a preferred glass transition temperature (Tg, DSC) which lies above room temperature. More preferably the Tg of the glassy block is at least more particularly at least 60° C., very preferably at least 80° C., and exceptionally preferably at least 100° C. The fraction of vinylaromatic blocks A within the entirety of the block copolymers is preferably 10 to 40 wt %, more preferably 20 to 33 wt %. Vinylaromatics for the construction of the block A comprise preferably styrene and a-methylstyrene. The block A may therefore take the form of a homopolymer or a copolymer. More preferably the block A is a polystyrene.

The block B is, in particular, a rubbery block or soft block having a preferred Tg of less than room temperature. The Tg of the soft block is more preferably less than 0° C., more particularly less than −10° C., for example, less than −40° C., and very preferably less than −60° C.

Preferred conjugated dienes as monomers for the soft block B are selected, in particular, from the group consisting of butadiene, isoprene, ethylbutadiene, phenylbutadiene, piperylene, pentadiene, hexadiene, ethylhexadiene, dimethylbutadiene, and the farnesene isomers, and also any desired mixtures of these monomers. The block B as well may take the form of a homopolymer or a copolymer.

The conjugated dienes as monomers for the soft block B are more preferably selected from butadiene and isoprene. For example, the soft block B is a polyisoprene, a polybutadiene, or a partly or fully hydrogenated derivative of one of these two polymers such as, in particular, polybutylenebutadiene; or is a polymer of a mixture of butadiene and isoprene. Very preferably the block B is a polybutadiene.

The matrix material of the foam layer may in principle have been foamed in any known way—for example, using expandable or pre-expanded microballoons; using other hollow microspheres such as hollow polymer spheres, hollow glass spheres, or hollow ceramic spheres; using solid spheres such as solid polymer spheres, solid glass spheres, solid ceramic spheres, or solid carbon spheres; chemically, by substances which on reaction release gas, or physically, by introduction of a blowing agent or blowing gas. The foam layer preferably comprises at least partly expanded microballoons or hollow glass spheres.

"Microballoons" are understood to be hollow microspheres which are elastic, and therefore expandable in their base state, and which have a thermoplastic polymer shell. These spheres are filled with low-boiling liquids or with liquefied gas. Shell materials used include, in particular, polyacrylonitrile, PVDC, PVC, or polyacrylates. Customary low-boiling liquids are, in particular, hydrocarbons of the lower alkanes, as for example isobutane or isopentane, which are included in the form of liquefied gas under pressure in the polymer shell.

Exposing the microballoons, in particular exposing them to heat, causes the outer polymer shell to soften. At the same time, the liquid blowing gas present within the shell undergoes transition into its gaseous state. The microballoons here undergo irreversible expansion, and expand three-dimensionally. Expansion is at an end when the internal pressure matches the outside pressure. Because the polymeric shell is retained, the result is a closed-cell foam.

A multiplicity of types of microballoon are available commercially, and differ essentially in their size (6 to 45 μm diameter in the unexpanded state) and in the onset temperatures they require for expansion (75 to 220° C.). Unexpanded microballoon types are also available as an aqueous dispersion with a solids fraction or microballoon fraction of around 40 to 45 wt %, and additionally as polymer-bound microballoons (masterbatches), for example, in ethylene-vinyl acetate, with a microballoon concentration of around 65 wt %. Not only the microballoon dispersions but also the masterbatches, like the unexpanded microballoons, are suitable as such for foaming the foam layer matrix material.

The foamed layer may also be produced using what are called pre-expanded microballoons. In the case of this group, the expansion takes place even before incorporation into the polymer matrix. Independently of the preparation pathway and of the initial form of the microballoons used, the foam layer preferably comprises at least partly expanded microballoons.

The term "at least partly expanded microballoons" is understood to mean that the microballoons have undergone expansion at least to an extent such that they produce a reduction in density of the matrix material to a technically meaningful extent by comparison with the same layer containing the unexpanded microballoons. This means that the microballoons need not necessarily have undergone complete expansion. With preference the "at least partly expanded microballoons" have undergone expansion in each case to at least twice their maximum extent in the unexpanded state.

The expression "at least partly expanded" relates to the expansion status of the individual microballoons, and is not intended to mean that only a portion of the microballoons in question must have undergone (incipient) expansion. If, therefore, "at least partly expanded microballoons" are present in the carrier layer, this means that all of these "at least partly expanded microballoons" have undergone at least partial expansion in the above sense, and unexpanded microballoons are not among the "at least partly expanded microballoons".

The foam layer preferably comprises silica, more preferably precipitated silica which has been surface-modified with dimethyldichlorosilane. This is advantageous because it can be used to adjust the thermal shear strength of the foam layer, and more particularly to increase it. Silicas, furthermore, can be used outstandingly for transparent layers.

Silica is present in the foam layer preferably at up to 15 wt %, based on the entirety of all the polymers present in the foam layer.

Further constituents of the foam layer may be customary additives, examples being plasticizers, aging inhibitors, fillers and/or flame retardants, and the like.

The compressive strength at 25% indentation depth (DIN EN ISO 3386-2 (2010), 25×25 mm, initial load 4 kPa, indentation velocity 30 mm/min, 1st cycle) of the foam layer is preferably more than 10 N/cm$^2$, more preferably more than 15 N/cm$^2$, more particularly more than 30 N/cm$^2$.

The foam preferably has a high compressive strength as above, so that the foam very largely retains its shape and dimension even under ongoing load. In that case, advantageously, even with unplanned, relatively high loads on the spool, there is no lateral oozing. Another factor advantageous for such behavior is when the lay-off distance between adjacent sections of the layered construction of the invention wound onto the spool is sufficiently large. However, this distance ought also not to be too large, causing the tape, on change of the winding direction, to tilt on the spool and/or to penetrate into grooves and so become deformed.

The foam layer may be an internal layer in the structure of the adhesive tape, and may therefore be provided on one or both sides with a PSA. In one embodiment, the foam layer itself has pressure-sensitively adhesive properties, and preferably the foam layer is the outer PSA layer (PSA-A) of the adhesive tape in the layered construction of the invention.

The layered construction of the invention comprises a release liner (RL) lying on the outer PSA layer (PSA-A).

Adhesive tapes coated on one or both sides with adhesives are usually, at the end of the production process, as already described, wound up to form a roll or spool. In the case of double-sided adhesive tapes, to prevent the PSAs coming into contact with one another, or to ensure greater ease of unwind in the case of single-sided adhesive tapes, the adhesive is covered, before the winding of the adhesive tape, with a covering material (also referred to as release material). To the skilled person, covering materials of these kinds are known as release liners, or simply liners. As well as the covering of single- or double-sided adhesive tapes, liners are also used to envelope labels.

The release liners additionally ensure that the adhesive is not contaminated prior to use. In addition, release liners may be adjusted, via the nature and composition of the release materials, in such a way that the adhesive tape can be unwound with the desired force (easy or difficult). In the case of adhesive tapes coated with adhesive on both sides, an additional function of the release liners is to ensure that the correct side of the adhesive is exposed first during unwind.

A liner or release liner is not a constituent of an adhesive tape or label, but instead merely a tool to the production or storage thereof or for the further processing. Furthermore, in contrast to an adhesive tape carrier, a liner is not joined firmly to a layer of adhesive.

Release liners used industrially are paper or film carriers which are furnished with an abhesive coating composition (also referred to as dehesive or antiadhesive composition) in order to reduce the tendency of adhering products to adhere to these surfaces (release effect function). Generally and also, correspondingly, for the release liner (RL), abhesive coating compositions which can be used, also called release coatings, encompass a multiplicity of different substances: waxes, fluorinated or part-fluorinated compounds, and silicones in particular, and also various copolymers with silicone fractions. In recent years, silicones have become largely established as release materials in the adhesive tape sector on account of their ease of processing, low costs, and the broad profile of properties. In addition, liners with polyolefin release layers have also come under the spotlight.

The release layer of the release liner (RL) may derive preferably from a crosslinkable silicone system. These crosslinkable silicone systems include mixtures of crosslinking catalysts/initiators and what are called thermally curable, condensation-crosslinking or addition-crosslinking polysiloxanes, or polysiloxanes which crosslink under radiation induction. The silicone release layer (SR1) may derive preferably from a radiation—(UV- or electron beam-), condensation—or addition-crosslinking system, more preferably from an addition-crosslinking system.

The silicone release layer of the release liner (RL) may derive from solvent-containing and/or solvent-free systems, and preferably derive from a solvent-free system.

Silicone-based release agents based on addition crosslinking may be cured in general through hydrosilylation. The formulations for producing these release agents typically comprise the following constituents:

a linear or branched polydiorganosiloxane containing alkenyl groups, a polyorganohydrogensiloxane crosslinking agent, and a hydrosilylation catalyst.

Established catalysts for addition-crosslinking silicone systems (hydrosilylation catalysts) include, in particular, platinum or compounds of platinum, such as, for example, the Karstedt catalyst (a Pt(0) complex compound). More specifically, addition-crosslinking release coatings of this kind may comprise the following components:

a) a linear or branched dimethylpolysiloxane which consists of around 80 to 200 dimethylpolysiloxane units and is stopped at the chain ends with vinyldimethylsiloxy units. Examples of typical representatives are solvent-free, addition-crosslinking silicone oils having terminal vinyl groups;

b) a linear or branched crosslinker which either has only methylhydrogensiloxy units in the chain (homopolymer crosslinker) or is composed of methylhydrogensiloxy and dimethylsiloxy units (copolymer crosslinker), with the chain ends being saturated either with trimethylsiloxy groups or with dimethylhydrogensiloxy groups. Examples of typical representatives of this class of product are hydrogenpolysiloxanes with a high reactive Si—H content;

c) a silicone MQ resin possessing as its M unit vinyldimethylsiloxy units as well as the trimethylsiloxy units commonly used;

d) a silicone-soluble platinum catalyst such as, for example a platinum-divinyltetramethyldisiloxane complex, referred to customarily as the Karstedt complex.

Silicone-containing systems for producing release coatings can be acquired commercially, for example, from Dow Corning, Wacker, or Momentive.

A silicone release system is typically applied in the uncrosslinked state and crosslinked subsequently.

Among the silicones specified, the addition-crosslinking silicones have the greatest economic significance. An unwanted property of these systems, however, is their sensitivity toward catalyst poisons, such as heavy metal compounds, sulfur compounds, and nitrogen compounds, for example (in this regard cf. "Chemische Technik, Prozesse and Produkte" by R. Dittmeyer et al., Volume 5, 5th edition, Wiley-VCH, Weinheim, Germany, 2005, Section 6-5.3.2, page 1142). It is generally considered that electron donors may be regarded as platinum poisons (A. Colas, Silicone Chemistry Overview, Technical Paper, Dow Corning). Consequently, phosphorus compounds as well, such as phosphines and phosphites, can be considered to be platinum poisons. Because of the presence of catalyst poisons, the crosslinking reaction between the various constituents of a silicone release agent no longer takes place, or takes place only to a small extent. In the production of antiadhesive silicone coatings, therefore, there is generally strict avoidance of the presence of catalyst poisons, particularly of platinum poisons.

Particular embodiments of the silicone systems are polysiloxane block copolymers, with a urea block, for example, or fluorosilicone release systems, which are used in particular with adhesive tapes featuring silicone adhesives. Use may also be made, additionally, of photoactive catalysts, referred to as photoinitiators, in combination with UV-curable, cationically crosslinking, epoxide-based and/or vinyl ether-based siloxanes and/or with UV-curable, radically crosslinking siloxanes such as acrylate-modified siloxanes, for instance. A further possibility is the use of electron beam-curable silicone acrylates. Photopolymerizable organopolysiloxane compositions may also be used. Examples would include compositions which are crosslinked in the presence of a photosensitizer through the reaction between organopolysiloxanes having hydrocarbon radicals bonded directly to silicon atoms and substituted by (meth)acrylate groups. Likewise possible for use are compositions wherein the crosslinking reaction takes place in the presence of a photosensitizer between organopolysiloxanes which have hydrocarbon radicals bonded directly to silicon atoms and substituted by mercapto groups, and organopolysiloxanes that have vinyl groups bonded directly to silicon atoms. Where organopolysiloxane compositions are used that have hydrocarbon radicals bonded directly to silicon atoms and substituted by epoxy groups, the crosslinking reaction is induced by release of a catalytic amount of acid, which is obtained by photodecomposition of added onium salt catalysts. Other organopolysiloxane compositions curable by a cationic mechanism are materials which have propenyloxysiloxane end groups, for example.

Depending on the intended use, the silicone systems may also include further additions, such as stabilizers or flow control assistants, for example.

The layered construction of the invention further comprises an interliner (IL), which is located on the side of the adhesive tape opposite from the outer PSA layer (PSA-A), the side of said interliner facing away from the adhesive tape being adhesively furnished.

The interliner (IL) preferably comprises a carrier layer which comprises monoaxially oriented polypropylene (MOPP), a polyester, a polyamide, or paper, or more preferably consists of MOPP, a polyester, a polyamide, or paper. These materials have advantageous stiffness and are therefore especially suitable for maintaining the foam mults dimensionally stable and also stable in an orientation parallel to the winding core. With particular preference the polyester is polyethylene terephthalate (PET).

The adhesively furnished side of the interliner (IL), being the side facing away from the adhesive tape, is formed preferably by a PSA which in principle is arbitrary provided it is suitable for an interliner. A "PSA suitable for an interliner" preferably exhibits good anchorage to the carrier material of the interliner, it also being possible, where appropriate, for this anchorage to be assisted by pretreatment of the carrier or of the PSA. Moreover, the adhesive preferably has good cohesion, so that residues are avoided when the interliner is removed and there is no oozing under the temperatures and pressures occurring within a spool.

The PSA is preferably a poly(meth)acrylate-based or natural rubber-based PSA. The PSA preferably has a coatweight of 1 to 30 g/m$^2$. Its peel adhesion (Afera 5001, Method A, 300 mm/min, 180°, steel) is preferably 0.3 to 5 N/cm, more preferably 1 to 4 N/cm. More particularly the peel adhesion (Afera 5001, Method F, 300 mm/min, 90°, outer side of release liner (RL)) of the PSA with respect to the relevant release liner (RL) in the spool structure is preferably 0.1 to 3 N/cm. As a result of these peel adhesion values, the interliner, or the layered construction of the invention overall, does not slip, during and after winding to a spool, but on the other hand the interliner can be parted from the release liner with customary application of force. The side of the release liner that is of interest here, in other words its side not lying on the outer PSA layer (PSA-A), is preferably siliconized or is a polyethylene (PE) or polypropylene (PP) layer.

An "adhesively furnished side of the interliner (IL)" refers to an outer side, and so the adhesive furnishing does not relate to an internal ply in the liner structure, but instead points outward; on the relevant side, therefore, the interliner (IL) is able to develop an outwardly directed bonding effect. The adhesive furnishing of the side of the interliner (IL) facing away from the adhesive tape is formed preferably by a poly(meth)acrylate-based PSA, which more particularly is based on an aqueous poly(meth)acrylate dispersion.

The total thickness (DIN EN 1942(2003), 10 mm disk, 51 kPa) of the interliner (IL) is preferably 50 to 300 µm, more preferably 70 to 150 –m. These ranges have proven particularly advantageous because the tendency for the spooled plies of the layered construction to stick to one another is greatly minimized, without any adverse effect on the flexibility of the layered construction, in terms of its capacity to conform to curves, for example.

The tensile strength (ISO 527-3 (1995-08); specimen type 2, test speed 150 mm/min) of the interliner (IL) is preferably 10 to 150 N/cm, more preferably 50 to 110 N/cm.

The adhesive tape-facing side of the interliner (IL) is formed either

- by a release layer, which is subject to everything that has been said regarding the release layer of the release liner (RL), or
- by a further layer of pressure-sensitive adhesive, which is subject to everything that has been said above regarding the pressure-sensitive adhesive which forms the side of the interliner (IL) facing away from the adhesive tape.

In one embodiment, the adhesive tape of the layered construction of the invention comprises an outer, heat-activatable layer of adhesive, which borders the interliner (IL) directly, and the adhesive tape-facing side of the interliner (IL) is formed by a further layer of pressure-sensitive adhesive, which is subject to everything said above regarding the pressure-sensitive adhesive which forms the side of the interliner (IL) facing away from the adhesive tape.

A "heat-activatable layer of adhesive" (also referred to synonymously below as "heat-activatable adhesive") refers to a layer of an adhesive which at room temperature is not tacky and which is able only by heating to develop sufficient adhesion to a substrate in order to produce an adhesive bond to said substrate. "Heating" typically refers to exposure to a temperature in the range from about 60 to about 200° C., in accordance with the invention more particularly in the range from 120° C. to 200° C.

The heat-activatable layer of adhesive is preferably a polyolefin layer. The polyolefin may derive from one or more olefin monomers. The material of the heat-activatable layer of adhesive is preferably selected from polyethylene, polypropylene, ethylene-propylene copolymers and mixtures of these polymers. More preferably the material of the heat-activatable layer of adhesive is polypropylene.

A further subject of the invention is a spool, which comprises a spool core and a layered construction of the invention wound crosswise in a plurality of plies on said core, wherein

- in the innermost ply, the adhesively furnished side of the interliner (IL) lies directly on the spool core, and
- in each ply, the adhesively furnished side of the interliner (IL) forms the inner side of the layered construction, being the side oriented to the spool core.

A spool of the invention is embodied advantageously because the interliner (IL) develops adhesion to the respectively underlying ply of the adhesive tape provided with the release liner (RL). As a result of this principle, adjacent plies of adhesive tape maintain their distance from one another even under internal and external loads on the spool, of the kind that may occur during storage, transport, and usage. Moreover, in the course of spooling, a reduced winding tension can be utilized, and so the adhesive tape can be wound up gently and without oozing.

A spool of the invention preferably has a diameter of up to 500 mm, more preferably of 200 to 400 mm. The weight of the spool is preferably not more than 20 kg, more preferably 5 to 15 kg. The adhesive tape of the layered construction of the invention preferably has a running length on the spool of up to 2000 m, more preferably of from 200 to 1600 m. The width of the adhesive tape and hence—since the layers finish substantially flush—of the layered construction of the invention on the spool is preferably 2 to 40 mm, more preferably 3 to 20 mm. The thickness of the layered construction of the invention on the spool is preferably 200 to 3000 μm, more preferably 400 to 1600 μm; with increasing thickness, the number of linear meters possible reduces correspondingly, and narrower dimensions are increasingly difficult to wind. The lay-off distance of adjacent sections of the layered construction of the invention on the spool is preferably more than 0.7 mm, more preferably 0.8 to 2 mm. In principle, the lay-off distance in the inner plies of the spool can be greater than in the outer plies.

The layered construction of the invention is made clearer by FIG. 1, which shows, illustratively, a layered construction of the invention lying on a spool core, with the sequence of the individual layers shown being illustrative. The denotations in FIG. 1 are as follows:

1—adhesive tape
2—release liner (RL)
3—outer layer of pressure-sensitive adhesive (PSA-A) of the adhesive tape
4—interliner (IL)
5—carrier of the interliner (IL)
6—adhesively furnished side of the interliner (IL), being the side facing away from the adhesive tape
7—spool core A further subject of the invention is a method for producing a spool of the invention, which comprises

- the providing of a layered construction of the invention wound up to form a master roll;
- the separating of the layered construction such that, from the web forming the master roll, a plurality of webs having a web width lower by comparison with the master roll are obtained;
- the providing of spool cores; and
- the winding of the webs onto respectively one spool core such that
  - a plurality of crosswise-overlapping plies are produced;
  - in the innermost ply, the adhesively furnished side of the interliner (IL) lies directly on the spool core; and
  - in each ply, the adhesively furnished side of the interliner (IL) forms the inner side of the layered construction, being the side oriented to the spool core.

The method of the invention may be performed advantageously without the separate lamination of an interliner—which is broader by comparison with the adhesive tape—and therefore can be performed substantially more efficiently than conventional methods.

In an alternative method, the webs are wound onto the spool core in such a way that in the innermost ply, the release liner (RL) lying on the outer layer of pressure-sensitive adhesive (PSA-A) lies directly on the spool core and, correspondingly, in each further ply as well, it forms the inner side of the layered construction, being the side oriented to the spool core. Since in this case the adhesively furnished side of the interliner (IL) faces outward in the final ply, the spool would be wrapped with an additional release liner.

EXAMPLES

Test Methods

Test Method T1: Visual Evaluation

The adhesive tapes listed in table 1, each lined on one side with a release liner and on the opposing side with an interliner, were trimmed to the respectively specified width, from a master roll, and were level-wound into a spool, subject to the parameters specified in the table. The resulting spools were stored under the following conditions:

1 month at 23° C.

1 month at 40° C.

2 months at 40° C.

This was followed by a visual evaluation according to each of the following (negative) criteria:

1. does the spool have deviations from the originally cylindrical form?
2. do the spool cores project asymmetrically to left and right?
3. is the distribution of the wound tape over the spool width uneven (different distance between adjacent tape sections)?
4. have the outermost tapes slipped off of the spool edges/are they no longer in their original position?

If all of the questions received the answer “no”, in the visual evaluation was rated as “ok”, otherwise as “not ok”.

Test Method T2: Unwind Behavior

After the storage described in method T1, the spools were unwound on an Ehnert AWS18G unwinder without a contact roller and without utilizing the interliner winder; the unwind speed was 15 m/min.

The criteria evaluated in this instance were as follows:

5. was it possible to unwind the spooled tape uniformly and without force peaks, particularly at the points of directional change?
6. did the composite hold together (no unintended detachment of the liner)?

7. was it always possible to separate adjacent tape sections cleanly (no sticking of adjacent tape sections), particularly in the region of the change in winding direction (up to 5 instances of minimal, reversible clinging to one another are acceptable, but are noted in the table)?
8. were the interliner and release liner congruent on the adhesive tape?
9. were there no perceptible deviations in the distance between adjacent tape sections?
10. were release liner and interliner free from folds?
11. did the adhesive tape sections from the reversal points in the winding direction retain their curve shape (comparison of two strips, each 1 m long, from the spool center and from the turn point; evaluation of the parallelism when placed alongside one another)?
12. was it possible to remove the interliner, after unwinding, uniformly and without clattering?

If all of the questions received the answer "yes", for the unwind behavior was rated as "ok", otherwise as "not ok". The deficiencies observed that were still acceptable are additionally set out in table 1.

The following adhesive materials were used as interliners (corresponding to interliner (IL)):

Interliner 1 (IL1): adhesive tape tesa® 64250 (single-sided acrylate adhesive tape with MOPP backing; available commercially; total thickness 80 μm; tensile strength 100 N/cm)

Interliner 2 (IL2): adhesive tape tesa® 4360 (single-sided acrylate adhesive tape with PE backing; available commercially; total thickness 51 μm; tensile strength 13 N/cm)

Interliner 3 (1L3): adhesive tape tesa® 50600 (single-sided silicone adhesive tape with PET backing; available commercially; total thickness 80 μm; tensile strength 50 N/cm)

The following adhesive tapes were used:

Adhesive tape 1: tesa® ACX$^{plus}$ 7805 PV29 (double-sided acrylate foam tape, with release liner on one side; available commercially) in a width of 6 mm; compressive strength 46 N/cm$^2$.

Adhesive tape 2: tesa® ACX$^{plus}$ 77115 PV28 (double-sided acrylate foam tape, with release liner on one side; available commercially) in a width of 10 mm; compressive strength 37 N/cm$^2$.

Adhesive tape 3: tesa® ACX$^{plus}$ 7812 PV29 (double-sided acrylate foam tape, with release liner on one side; available commercially) in a width of 4 mm, compressive strength 46 N/cm$^2$.

Adhesive tape 4: tesa® ACX$^{plus}$ 77811 PV 15 (double-sided acrylate foam tape, with release liner on one side; available commercially) in a width of 6 mm; compressive strength 16 N/cm$^2$.

The respective structure was provided in the form of a master roll with adhesive tape and applied release liner and also interliner. The master rolls were unwound using a spooler, and slit. The resulting layered constructions, cut to the target width, were then wound using a winder to form level-wound spools; the respective parameters are reported in table 1.

TABLE 1

| No. | Adhesive tape No. | Inter-liner No. | Lay-off distance | Winding tension | Running length of spool | Visual evaluation | Unwind behavior |
|---|---|---|---|---|---|---|---|
| 1 | 1 | 1 | 0.8 mm | 190 cN/cm | 900 lm | ok | ok |
| 2 | 3 | 1 | 0.8 mm | 190 cN/cm | 900 lm | ok | ok |
| 3 | 2 | 2 | 1.0 mm | 190 cN/cm | 500 lm | ok | ok (2 instances of slight pulling on directional change) |
| 4 | 4 | 3 | 0.9 mm | 190 cN/cm | 700 lm | ok | ok (3 instances of slight pulling in internal wound plies) |

The invention claimed is:

1. A layered construction comprising an adhesive tape comprising at least one outer layer of pressure-sensitive adhesive;

a release liner lying on the at least one outer layer of pressure-sensitive adhesive; and an interliner lying on a side of the adhesive tape opposite the at least one outer layer of pressure-sensitive adhesive, a side of the interliner facing away from the adhesive tape is provided with an adhesive;

wherein all layers of the layered construction finish substantially flush with respect to each other, and an adhesive tape-facing side of the interliner is formed by a release layer.

2. The layered construction of claim 1, wherein the interliner comprises a carrier layer comprising MOPP, a polyester, a polyamide, or paper.

3. The layered construction of claim 1, wherein the adhesive tape comprises a foam layer based on poly(meth) acrylate.

4. The layered construction of claim 1, wherein the adhesive disposed on the side of the interliner facing away from the adhesive tape is formed by a poly(meth)acrylate-based or natural rubber-based pressure-sensitive adhesive.

5. A spool, comprising a spool core and the layered construction of claim 1, wherein the layered construction is wound crosswise in a plurality of plies on the spool core, wherein in an innermost ply, an adhesively furnished side of the interliner lies directly on the spool core, and in each ply of the plurality of plies, the adhesively furnished side of the interliner forms an inner side of the layered construction, being the side oriented to the spool core.

* * * * *